(12) United States Patent
Ruddick

(10) Patent No.: US 9,852,663 B2
(45) Date of Patent: Dec. 26, 2017

(54) PERSONAL SIGNAGE ASSEMBLY

(71) Applicant: William Ruddick, Santee, CA (US)

(72) Inventor: William Ruddick, Santee, CA (US)

( * ) Notice: Subject to any disclaimer, the term of this patent is extended or adjusted under 35 U.S.C. 154(b) by 0 days.

(21) Appl. No.: 14/997,622

(22) Filed: Jan. 18, 2016

(65) Prior Publication Data
US 2017/0206810 A1    Jul. 20, 2017

(51) Int. Cl.
*G09F 21/02* (2006.01)
*G09F 3/08* (2006.01)
*G03B 17/56* (2006.01)

(52) U.S. Cl.
CPC .............. *G09F 3/08* (2013.01); *G03B 17/568* (2013.01); *G09F 21/026* (2013.01)

(58) Field of Classification Search
CPC ...................................................... G09F 21/026
USPC ........................................... 40/639, 586, 520
See application file for complete search history.

(56) References Cited

U.S. PATENT DOCUMENTS

| | | | | |
|---|---|---|---|---|
| 1,624,429 A | * | 4/1927 | Palmer ................ | A41D 19/0024 2/159 |
| 4,369,215 A | * | 1/1983 | Offen ........................ | D04D 7/06 28/147 |
| 4,555,236 A | | 11/1985 | Peyton | |
| 4,964,824 A | * | 10/1990 | Spencer ................. | A63B 31/04 441/57 |
| 5,749,097 A | | 5/1998 | Garrett-Rose | |
| 5,848,928 A | | 12/1998 | Wong | |
| 6,058,510 A | * | 5/2000 | Breitenbach ..... | A41D 19/01594 172/371 |
| 6,155,836 A | * | 12/2000 | Hancock ................ | G09N 19/02 2/159 |
| 6,309,076 B1 | | 10/2001 | McVicker | |
| 7,463,238 B2 | | 12/2008 | Funkhouser et al. | |
| D599,122 S | | 9/2009 | Feldpausch et al. | |
| 7,717,335 B2 | | 5/2010 | Halbur et al. | |
| 2008/0005822 A1 | * | 1/2008 | Lavner ................. | A41D 13/087 2/21 |
| 2008/0005942 A1 | * | 1/2008 | Harney .................... | G09F 11/21 40/518 |
| 2014/0227931 A1 | * | 8/2014 | Lewis .................... | A63H 33/00 446/26 |

FOREIGN PATENT DOCUMENTS

EP          2336822        6/2011

* cited by examiner

*Primary Examiner* — Kristina N Junge

(57) ABSTRACT

A personal signage assembly includes a pair of finger engaging members. Each of the finger engaging members engages a person's finger. A pair of mounts is provided and each of the finger engaging members has one of the mounts attached thereto. An elongated panel has first end and a second end. Each of the first and second ends has one of the mounts attached thereto. The panel has indicia thereon and has a length from the first end to the second end being less than 5.0 inches.

8 Claims, 3 Drawing Sheets

PERSONAL SIGNAGE ASSEMBLY

BACKGROUND OF THE DISCLOSURE

Field of the Disclosure

The disclosure relates to portable self-portrait signage devices and more particularly pertains to a new portable self portrait signage device for displaying a message when a person takes a photo of themselves.

SUMMARY OF THE DISCLOSURE

An embodiment of the disclosure meets the needs presented above by generally comprising a pair of finger engaging members. Each of the finger engaging members engages a person's finger. A pair of mounts is provided and each of the finger engaging members has one of the mounts attached thereto. An elongated panel has first end and a second end. Each of the first and second ends has one of the mounts attached thereto. The panel has indicia thereon and has a length from the first end to the second end being less than 5.0 inches.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
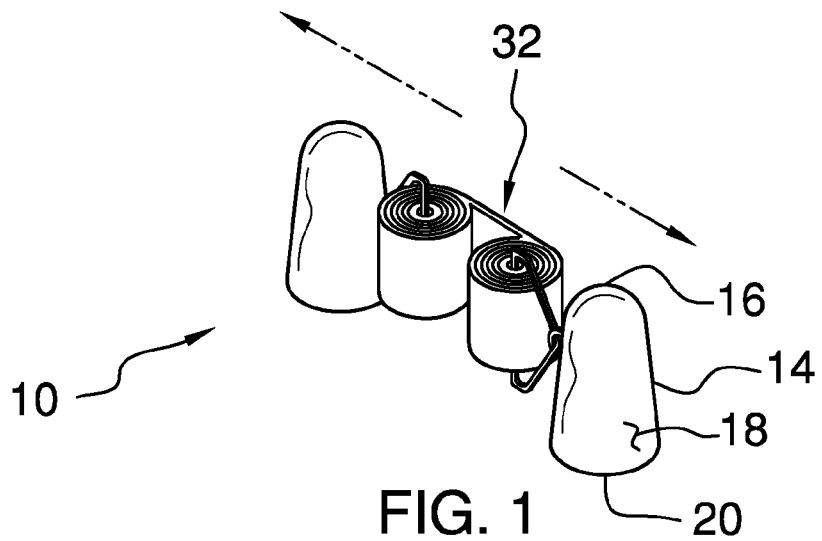
FIG. 1 is a front perspective view of a personal signage assembly according to an embodiment of the disclosure.
Figure 2:
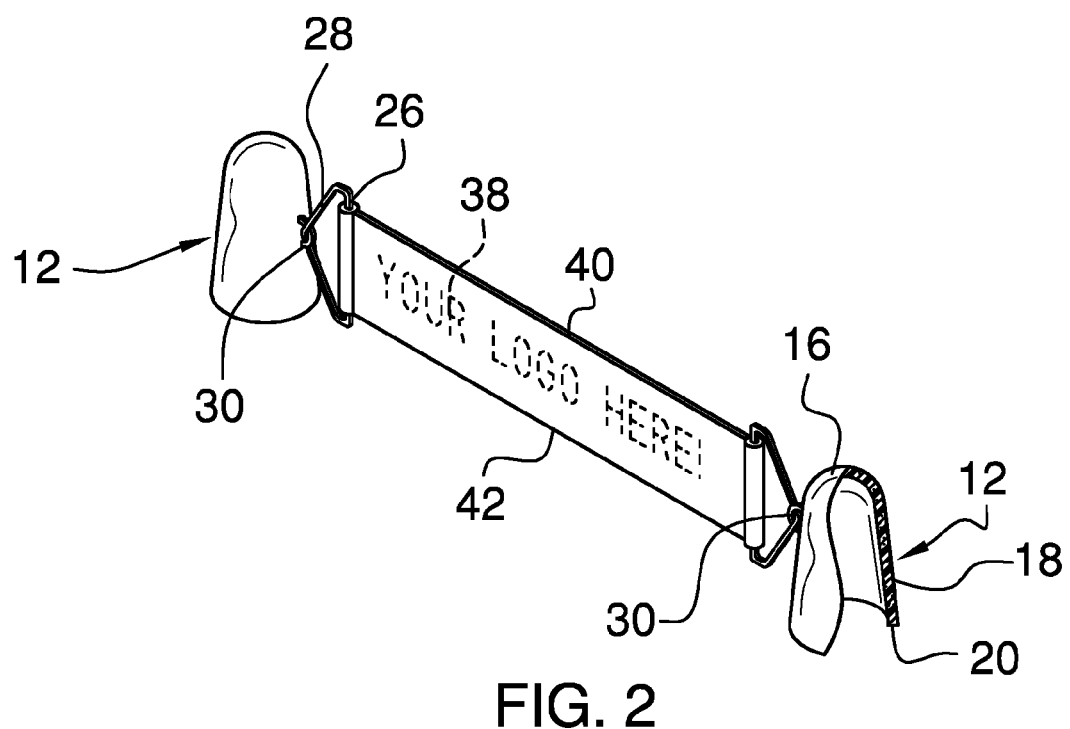
FIG. 2 is a broken front perspective view of an embodiment of the disclosure.

With reference now to the drawings, and in particular to FIGS. 1 through 5 thereof, a new portable self-portrait signage device embodying the principles and concepts of an embodiment of the disclosure and generally designated by the reference numeral 10 will be described.

Figure 5:
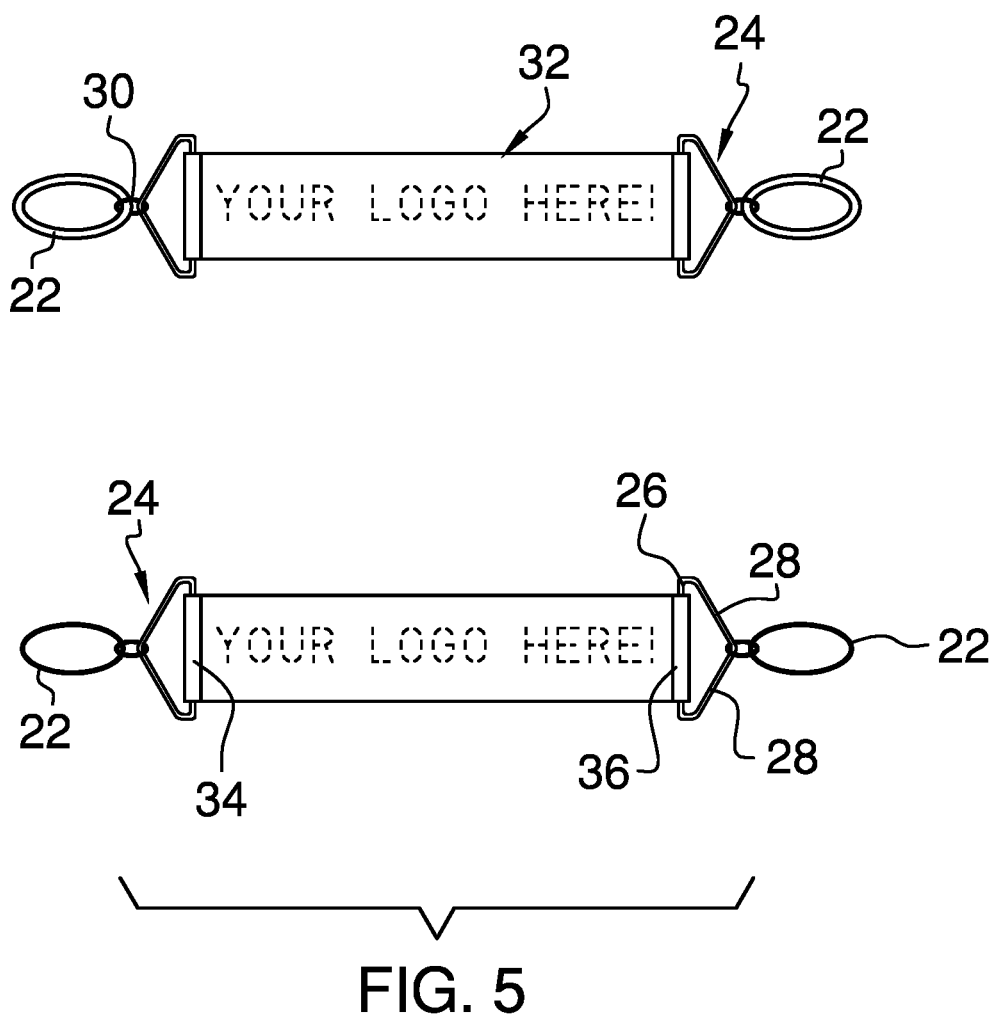
FIG. 5 is a front view of an embodiment of the disclosure.

As best illustrated in FIGS. 1 through 5, the personal signage assembly 10 generally comprises a pair of finger engaging members 12. Each of the finger engaging members 12 is configured to engage a person's finger and more particularly receive and cover a tip of a person's finger. Generally, one of the finger engaging members 12 will receive the thumb while the other will receive the index finger. The finger engaging members 12 each comprise a housing 14 having a top wall 16 and a perimeter wall 18 that is attached to and extends downwardly from the top wall 16. The housing 14 is comprised of a resiliently deformable material which may also be resiliently stretchable. The perimeter wall 18 tapers outwardly from the top wall to a bottom edge 20 thereof. The housing 14 has a height from the top wall 16 to the bottom edge 20 of the perimeter wall 18 that is less than 2.0 inches and which may be between 0.5 inches and 1.5 inches. FIG. 5 shows a pair of finger engaging member 12 embodiments including stretchable, closed loops 22.

A pair of mounts 24 is provided and each of the finger engaging members 12 has one of the mounts 24 attached thereto. Each of the mounts includes 24 a spindle 26. The spindle 26 is attached to a pair of arms 28 that are in turn coupled to the finger engaging members 12. As can be seen in the Figures, the arms 28 may connect to each other and extend through a loop 30 attached to the perimeter wall 18 of an associated one of the finger engagement members 12.

An elongated panel 32 is provided which has first end 34 and a second end 36. Each of the first 34 and second 36 ends has one of the mounts 24 attached thereto. The panel 32 has indicia 38 thereon which may comprise a logo or a message. Thus, the indicia 38 may be related to the person using the assembly 10, to the location where the person is taking a picture, to an event the person is attending and the like. The panel 32 is comprised of material that has a memory shape such that the panel 32 winds upon itself. This material will typically comprise either a resilient elastomer, a plastic or a metallic material. As shown in FIG. 1, when the panel 32 winds upon itself it becomes very portable and can be transported within a pocket. Each of the first 34 and second 36 ends is rotatably coupled to one of the spindles 26 and more particularly the first 34 and 36 ends may comprise a sleeve through which the spindles 26 extend. The panel 32 has a length from the first end 34 to the second end 36 being less than 5.0 inches. The panel 32 has a height from an upper edge 40 to a lower edge 42 that is less than 1.5 inches.

Figure 3:
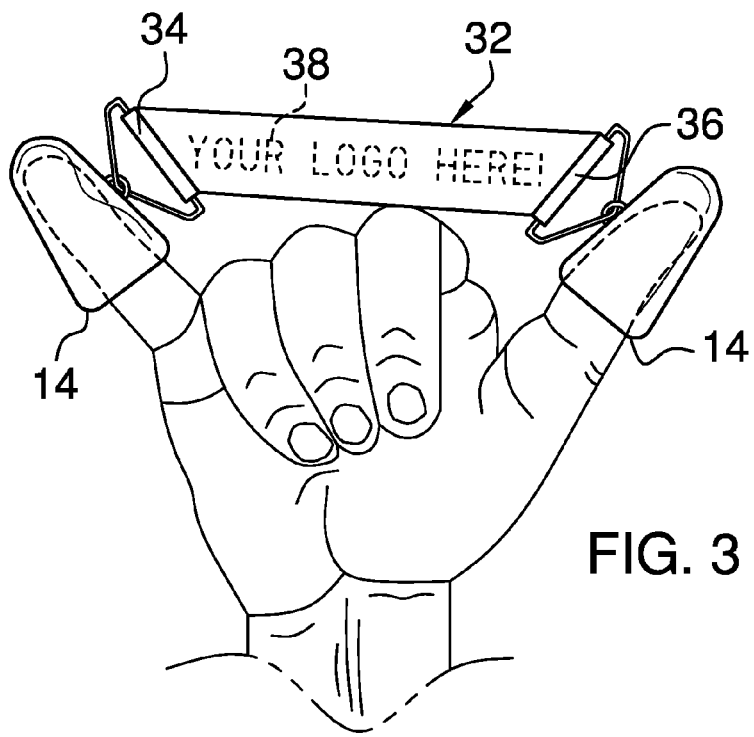
FIG. 3 is a front in-use view of an embodiment of the disclosure.
Figure 4:
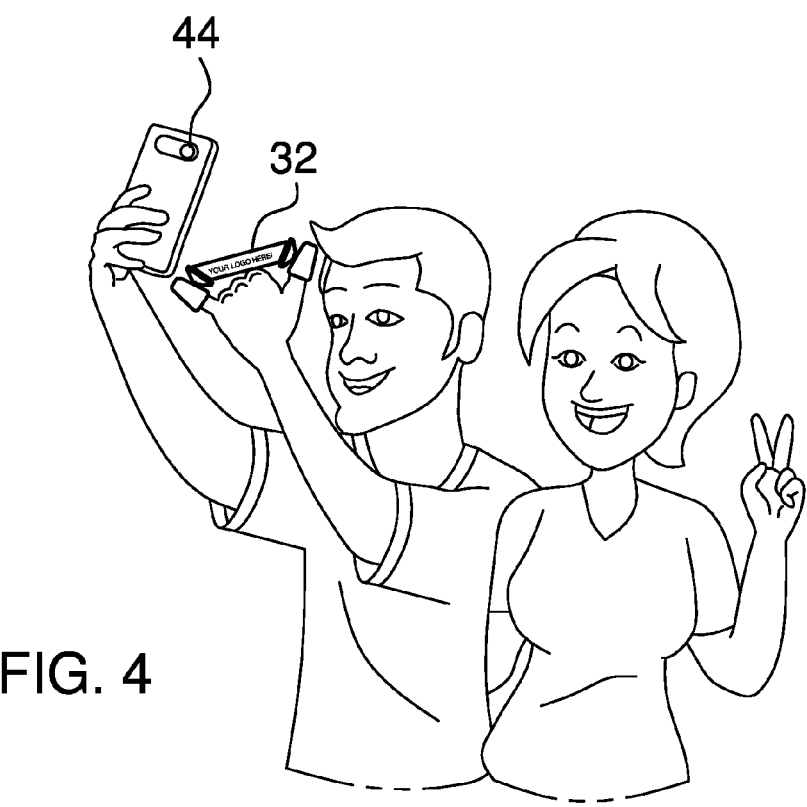
FIG. 4 is a front in-use view of an embodiment of the disclosure.

In use, a person who wishes to take a self-portrait known as a "selfie" with their camera, such as those mounted on a cellular phone 44, inserts their fingers into the finger engaging members 12 as is shown in FIG. 3. The user then spreads those fingers apart to unwind the panel 32 to display the indicia 38 which is held in front of themselves while a photo is being taken.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A personal sign assembly configured to be supported by a person's fingers while taking a self-portrait, said personal sign assembly comprising:
   a pair of finger engaging members, each of said finger engaging members being configured to engage a person's finger;
   a pair of mounts, each of said finger engaging members having one of said mounts attached thereto such that said mount is laterally aligned with said finger engaging member, each of said mounts including a respective spindle, each said spindle being oriented to be parallel to said finger engaging member to which said mount is attached; and
   an elongated panel having first end and a second end, each of said first and second ends being rotatably coupled to one of said spindles wherein each of said first and second ends having one of said mounts attached thereto and said panel extends perpendicularly between and in alignment with said finger engaging members, said panel having indicia thereon, said panel having a length from said first end to said second end being less than 5.0 inches.

2. The personal sign assembly according to claim 1, wherein each of said finger engaging members is configured to receive and cover a tip of a person's finger.

3. The personal sign assembly according to claim 2, wherein each of said finger engaging members comprises a housing having a top wall and a perimeter wall being attached to and extending downwardly from said top wall, said housing being comprised of a resiliently stretchable material.

4. The personal sign assembly according to claim 3, wherein said perimeter wall tapers outwardly from said top wall to a bottom edge thereof.

5. The personal sign assembly according to claim 3, wherein said housing has a height from said top wall to a bottom edge of said perimeter wall being less than 2.0 inches.

6. The personal sign assembly according to claim 1, wherein
   said panel is comprised of material having a memory shape such that said panel winds upon itself.

7. The personal sign assembly according to claim 1, wherein said panel has a height from an upper edge to a lower edge being less than 1.5 inches.

8. A personal sign assembly configured to be supported by a person's fingers while taking a self-portrait, said personal sign assembly comprising:
   a pair of finger engaging members, each of said finger engaging members being configured to receive and cover a tip of a person's finger, said finger engaging members each comprising:
      a housing having a top wall and a perimeter wall being attached to and extending downwardly from said top wall, said housing being comprised of a resiliently stretchable material, said perimeter wall tapering outwardly from said top wall to a bottom edge thereof, said housing having a height from said top wall to said bottom edge of said perimeter wall being less than 2.0 inches;
   a pair of mounts, each of said finger engaging members having one of said mounts attached thereto such that said mount is laterally aligned with said finger engaging member, each of said mounts including a respective spindle, each said spindle being oriented to be parallel to said finger engaging member to which said mount is attached; and
   an elongated panel having first end and a second end, each of said first and second ends having one of said mounts attached thereto, said panel having indicia thereon, said panel being comprised of material having a memory shape such that said panel winds upon itself, each of said first and second ends being rotatably coupled to one of said spindles wherein said panel extends perpendicularly between and in alignment with said finger engaging members, said panel having a length from said first end to said second end being less than 5.0 inches, said panel having a height from an upper edge to a lower edge being less than 1.5 inches.

* * * * *